United States Patent [19]
Feldman

[11] 4,067,481
[45] Jan. 10, 1978

[54] HAND-HOLDABLE GUN FOR LONGITUDINAL EXTRUSION OF A THERMOPLASTIC-TYPE MEDIUM THEREFROM AND REMOVABLE HEAT SLEEVE THEREFOR

[76] Inventor: Benjamin Feldman, 84 Choir Lane, Westbury, N.Y. 11590

[21] Appl. No.: 680,732

[22] Filed: Apr. 27, 1976

[51] Int. Cl.² .................. B65D 83/00; B29F 3/08
[52] U.S. Cl. .................. 222/146 HE; 222/326; 222/563; 219/230; 219/535
[58] Field of Search ............ 222/146 HE, 146 H, 326, 222/327, 563; 425/144; 219/230, 301, 424, 535

[56] References Cited

U.S. PATENT DOCUMENTS

| | | | |
|---|---|---|---|
| 3,121,516 | 2/1964 | Dewees et al. | 222/326 |
| 3,190,502 | 6/1965 | Knibb | 222/146HE |
| 3,231,716 | 1/1966 | Van Den Bosch | 219/525 X |
| 3,369,714 | 2/1968 | Dewees et al. | 222/327 |
| 3,872,281 | 3/1975 | Krieg et al. | 219/535 |

FOREIGN PATENT DOCUMENTS

| | | | |
|---|---|---|---|
| 1,074,577 | 4/1954 | France | 222/563 |
| 1,954,812 | 5/1971 | Germany | 222/146 HE |
| 257,667 | 9/1926 | United Kingdom | 219/535 |

*Primary Examiner*—Robert B. Reeves
*Assistant Examiner*—Frederick R. Handren
*Attorney, Agent, or Firm*—Hubbell, Cohen, Stiefel & Gross

[57] ABSTRACT

A removable heat sleeve for use in hand-holdable gun for facilitating longitudinal extrusion of a thermoplastic-type medium from a removable self-contained storage cartridge container therefor in response to piston pressure along the longitudinal axis of the container comprises a first heat reflective sleeve surrounding the cartridge container for reflecting heat toward the hollow heating sleeve interior for providing a controlled temperature thereto, an electric heating coil surrounding the first heat reflective sleeve for heating the hollow heat sleeve interior to the controlled temperature in response to voltage applied thereto, and a first heat transmissive removable burst shield sleeve within the interior of the first heat reflective sleeve and at least partially surrounding the heat sleeve surrrounded cartridge container to provide a complete burst shield enclosure for the container for physically isolating the heat sleeve first reflective sleeve and heating coil from the container to prevent fouling thereof in the event of burst of the cartridge container while enabling heating of the thermoplastic-type medium within the cartridge container to the controlled temperature. Thus, the thermoplastic-type piston pressure actuated extrusion may be readily accomplished independent of the outside ambient temperature of the storage container therefor.

26 Claims, 8 Drawing Figures

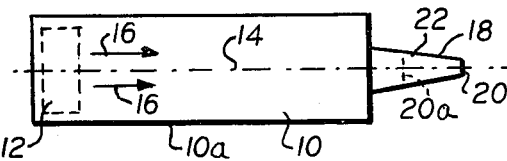
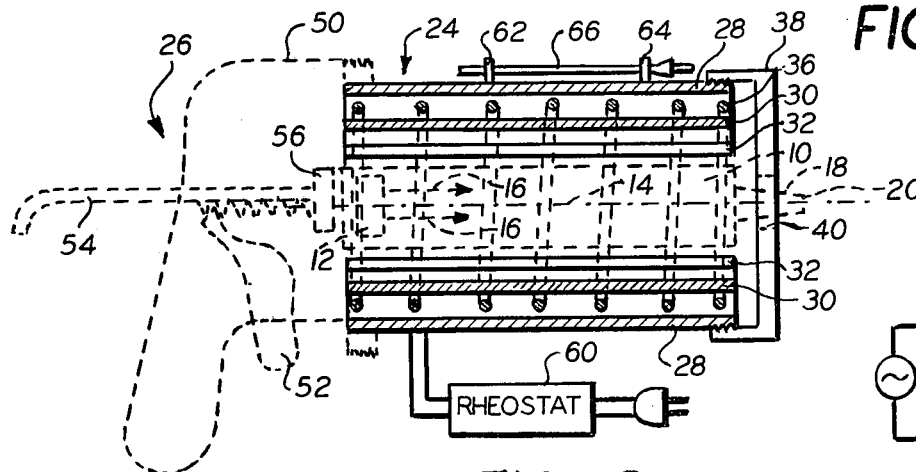
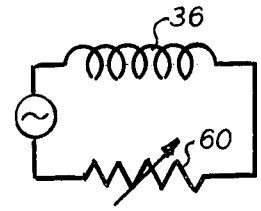
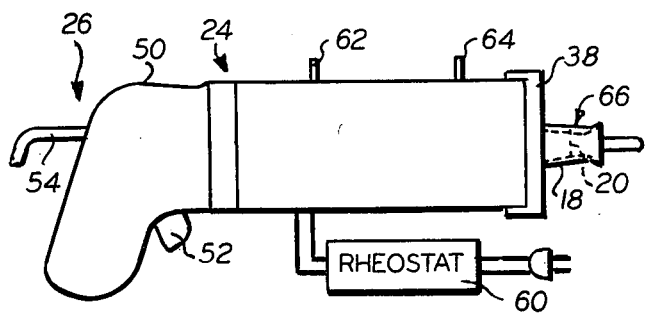
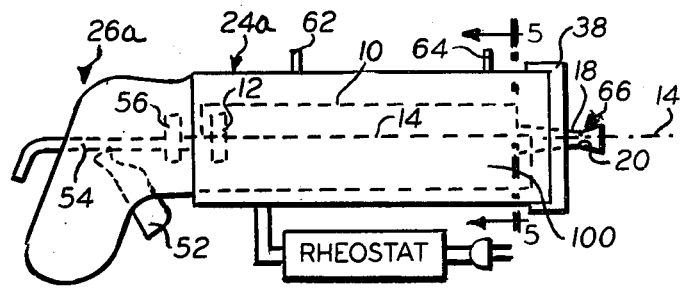
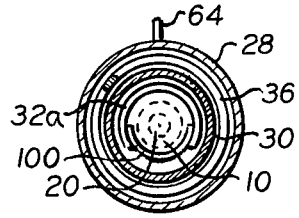
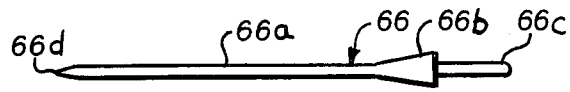

HAND-HOLDABLE GUN FOR LONGITUDINAL EXTRUSION OF A THERMOPLASTIC-TYPE MEDIUM THEREFROM AND REMOVABLE HEAT SLEEVE THEREFOR

BACKGROUND OF INVENTION

1. Field of Invention

The present invention relates to hand-holdable guns for longitudinally extruding a thermoplastic-type medium from a removable storage cartridge container therefor and heating means for use with such guns to facilitate said extrusion.

2. Description of the Prior Art

Several different types of prior art hand-holdable guns for enabling the longitudinal extrusion of a thermoplastic-type medium therefrom exist as do such guns in which heat is utilized to facilitate the extrusion of the thermoplastic-type medium from the gun, such as disclosed in U.S. Pat. Nos. 2,995,159; 3,204,828; 3,337,093; 3,281,576 and 3,776,426. Furthermore, such prior art type of hand-holdable longitudinal extrusion guns, also employ electric heating coils whose heat may be varied in order to vary the heat applied to the plastic material extruded from the gun, such as disclosed in U.S. Pat. No. 2,556,609. In addition, prior art longitudinal extrusion guns have also employed removable heating coils for facilitating the longitudinal extrusion of a thermoplastic-type medium from a storage container therefor, such as disclosed in U.S. Pat. No. 3,551,640. However, there are presently no prior art hand-holdable longitudinal extrusion type guns known to the Inventor having a removable heat sleeve therefor for facilitating the longitudinal extrusion of a thermoplastic-type medium from a storage container or cartridge therefor wherein a complete burst shield enclosure is provided for the cartridge within the heat sleeve for physically isolating the heat sleeve interior in the cartridge container to prevent fouling thereof in the event of burst of the cartridge container while enabling heating of the thermoplastic-type medium within the cartridge container to a controlled temperature. Furthermore, there are no such prior art longitudinal extrusion guns known to the Inventor in which a heat transfer plug is employed to prevent initial clogging of the extrusion outlet to facilitate flow therefrom. These disadvantages of the prior art are overcome by the present invention.

BRIEF DESCRIPTION OF DRAWINGS

FIG. 1 is a diagrammatic illustration of a typical conventional cartridge container for storage of a thermoplastic-type medium therein;

FIG. 2 is a cross sectional view, partially diagrammatic, of the preferred embodiment of the heat sleeve of the present invention with the balance of the improved hand-holdable gun utilizable therewith being shown in dotted lines;

FIG. 2A is a schematic diagram of the electrical control circuit for the coil portion of the heat sleeve of FIG. 2;

FIG. 3 is a view similar to FIG. 2 of the improved gun of FIG. 2 with a preferred embodiment of a heat transfer plug inserted in the tip of the cartridge;

FIG. 4 is a side view diagrammatic illustration similar to FIG. 3 of an alternative embodiment of a gun useable with the heat sleeve of the present invention;

FIG. 5 is a sectional view taken along line 5—5 of FIG. 4 of the gun of FIG. 4;

FIG. 6 is an enlarged view of the preferred heat transfer plug illustrated in FIGS. 2 and 3; and FIG. 7 is an enlarged view, similar to FIG. 6, of the heat transfer plug illustrated therein but rotated 90° from the position shown in FIG. 6.

DETAILED DESCRIPTION OF THE PREFERRED EMBODIMENTS

Referring now to the drawings in detail, and initially to FIG. 1 thereof, a typical conventional commercially available storage container 10 for a thermoplastic-type longitudinally extrudable medium, such as caulking, adhesive or sealant, such as the type commercially manufactured by Red Devil is shown. Such a conventional storage container 10 preferably includes a storage portion 10a for the thermoplastic-type medium, and an outwardly extending tip portion 18 through which the stored thermoplastic-type medium is longitudinally extruded. The storage container portion 10a preferably includes an internal cartridge plunger 12 which is preferably longitudinally movable along the longitudinal axis 14 of the container 10 in the direction of arrows 16 in response to a piston actuated drive thereat by a conventional hand-held caulking gun. The tip portion 18 is preferably tapered and includes an extrusion outlet 20 which is thermally sealed as provided from the manufacturer. In use, the extrusion outlet 20 may be of any desired diameter depending upon where along the longitudinal axis 14 running therethrough the tapered tip 18 is cut, a relatively narrow diameter 20 being shown in solid lines in FIG. 1 and a considerably larger diameter 20a being shown in dotted lines in FIG. 1, assuming the tip 18 were cut instead at a different location 22. As will be explained in greater detail hereinafter, the heating sleeve 24 of the present invention preferably surrounds and applies heat to the storage container 10a interior and its thermoplastic-type medium contents while at the same time enabling longitudinal pressure to be exerted against the cartridge plunger 12 within the storage container 10a to longitudinally extrude its thermoplastic-type medium contents through the extrusion outlet 20 of the tapered tip 18. Typically, a conventional storage container 10 may have an outer diameter of 2 inches with an overall length of approximately 8½ inches for storage portion 10a and an overall length of approximately 3 inches for uncut tip portion 18.

Referring now to FIG. 2, the preferred embodiment of the heating sleeve 24 of the present invention is shown. FIG. 2 further illustrates the preferred heating sleeve 24 removably mounted so as to form the presently preferred improved hand-holdable longitudinal extrusion gun, generally referred to by the reference numeral 26, of the present invention, with other portions of the gun 26 being shown in dotted lines in FIG. 2 for purposes of clarity. The preferred heating sleeve 24 preferably comprises a plurality of concentric coaxially mounted cylinders 28, 30 and 32 with a concentric coaxially mounted conventional electric heating coil 36 preferably being mounted between cylinders 28 and 30 and with the concentric spacing between cylinders 28, 30 and 32 being maintained by any suitable means. The cylinders 28, 30 and 32 may also preferably be termed sleeves, with sleeves 28 and 30 having their inner side, that is the side closest to the longitudinal axis 14, preferably coated with a highly heat reflective material, such as being silvered, to confine and reflect any heat directed thereto towards the interior of the hollow removable heat sleeve 24. As previously mentioned, the electric heating coil 36 is preferably sandwiched between heat reflective sleeves or cylinders 28 and 30. As previously mentioned, the annular electric coil 36 is preferably helically wound between heat reflective sleeves 28 and 30, with heat reflective sleeves 28 and 30 and annular electric coil 36 all being preferably permanently coaxially mounted within heat sleeve 24, and with sleeve or cylinder 32 preferably being coaxially removably mounted therein. Removable sleeve 32 preferably comprises a burst shield which preferably completely encloses the storage container 10a and which is preferably removably inserted within the interior of hollow heat sleeve 24 in a manner to be described in greater detail hereinafter, to provide a complete burst shield enclosure therefor for physically isolating the innermost heat reflective sleeve 30 from the storage container 10a to prevent fouling thereof in the event of accidental burst of the storage container 10a. Furthermore, burst shield or sleeve 32 is preferably comprised of a heat transmissive material, such as a heat transmissive thermoplastic, so that it additionally enables heating of the thermoplastic-type medium contained within the storage portion 10a of container 10. As further shown and preferred in FIG. 2, the preferred heat sleeve 24 also preferably includes an end cap 38 which is preferably threadably conventionally mounted on threads at one end of heat sleeve 24 to close that end. The end cap 38 preferably includes a centrally located aperture 40 for enabling protrusion of the cartridge tip 18 therethrough to thereby provide an extrusion outlet 20 for the contents of the storage portion 10a of cylinder 10. The opposite end of the heat sleeve 24 also preferably contains exterior threads to facilitate removable threadable connection to the handle portion 50 of a conventional ratchet-type caulking gun of the type which normally permits threadable mounting of a caulking container thereto. Such a conventional-type of caulking gun, such as the type manufactured by Kenmar Manufacturing Co., Philadelphia, Pa. (model No. 32), and disclosed in U.S. Pat. No. 2,284,602, includes a trigger 52 actuated conventional ratchet mechanism for advancing a conventional longitudinally mounted rod 54 and piston 56 longitudinally along longitudinal axis 14 to advance the cartridge plunger 12 in the direction of arrows 16 and pressure extrude the thermoplastic-type medium from the interior of storage portion 10a through the extrusion outlet 20.

As further shown and preferred in FIGS. 2 and 2A, the heating coil 36 preferably receives voltage applied thereto through a conventional rheostat 60 which is preferably conventionally adjustable so as to vary the voltage supplied thereto.

In addition, as further shown and preferred in FIG. 2, the preferred removably mountable hollow heat sleeve 24 also preferably includes a conventional mounting means, such as conventional clips 62 and 64, for mounting a preferred heat transfer plug 66, to be described in greater detail hereinafter with reference to FIGS. 3, 6 and 7, with FIG. 3 being a diagrammatic illustration side view similar to FIG. 2 of the embodiment of FIG. 2 with the exception that the heat transfer plug 66 has been removed from its rest position as shown in FIG. 2 to its normal use portion inserted in the tip 18 as shown in FIG. 3. The heat transfer plug 66, when inserted in tip 18 through extrusion outlet 20, preferably seals this outlet 20 while transferring heat therethrough from the heated container 10a interior to the interior of the tip 18 located outside sleeve 24, which tip 18 would not otherwise normally be heated.

The typical preferred dimensions, by way of example, for the heat sleeve 24 of the present invention are as follows with the removable burst sheild sleeve 32 having an inner diameter of approximately 2⅛ inches and an outer diameter of approximately 2¼ inches to accommodate a cartridge 10 having an outer diameter of approximately 2 inches; with innermost heat reflective sleeve 30 having an inner diameter of approximately 2⅜ inches and an outer diameter of approximately 2 9/16 inches; and with the outermost heat reflective sleeve 28 having an inner diameter of approximately 2 13/16 inches and an outer diameter of approximately 3 inches. It should be noted that preferably the annular heating coil 36 is sandwiched in the approximately ⅛ inch spacing provided between sleeves 28 and 30. The temperature provided by the annular heating coil 36 may preferably be varied in conventional fashion by a conventional adjustable rheostat 60 with the aforementioned conventional electric circuit being shown in FIG. 2A.

Before describing the operation of the preferred improved heated caulking gun 26 of the present invention, the tapered heat transfer plug 66 shall now be described in greater detail hereinafter with reference to FIGS. 6 and 7. As shown and preferred in FIG. 6, the heat transfer plug 66 preferably includes a longitudinal pin-like portion 66a, which extends for the majority of the longitudinal length thereof, a tapered plug portion 66b at one end thereof and a rotary cutter portion 66c extending from the tapered portion 66b. As further shown and preferred in FIG. 7, for purposes of safety, the rotary cutter portion 66c preferably comprises a recessed conventional rotary cutter 68 having an exterior cutting edge 68a. As still further shown and preferred in FIGS. 6 and 7, the heat transfer portion 66a of heat transfer plug 66 preferably includes a pointed tip 66d for piercing the seal at extrusion outlet 20 which would normally be formed from the hardening of the thermoplastic-type medium contained in the tip 18 after initial use of the container 10. Heat transfer plug 66 is preferably made of any conventional good heat transfer material, such as stainless steel (for cutter edge life). For use with the conventional type of cartridges 10 previously described with reference to FIG. 1, the heat transfer plug 66 may preferably have an overall longitudinal length of 6 inches for portions 66d, 66a and 66b of heat transfer plug 66, with the heat transfer plug portion 66a preferably having approximately a ⅛ inch diameter, by way of example, for use with such conventional cartridges 10 and with the tapered portion 66b preferably having a longitudinal length of approximately 1 inch tapering from the approximately ⅛ inch diameter to a maximum diameter of preferably approximately ¼ inch so as to be useful for extrusion outlet sizes of tip 18 of between approximately ⅛ inch and ¼ inch. Of course, if it is desired to use such a heat transfer plug 66 with extrusion outlets of greater diameter then of course the taper could be longer or could more rapidly taper towards the desired diameter, depending on the internal configuration of the tip 18 with which the heat transfer plug 66 is to be utilized.

Referring once again to FIG. 2, the overall operation of the preferred improved heated thermoplastic-type medium longitudinal extrusion gun 26 of the present invention shall be described. Before utilizing the gun 26, the preferred heat sleeve 24 is removed from the gun 26. The conventional cartridge 10 from which the material is to be extruded, is then preferably inserted into the interior of the hollow sleeve 24 to enable the tip portion 18 to extend through aperture 40 in end cap 38. Heat sleeve 24 is then threadably reconnected to the handle portion 50 of the gun 26 and the piston 56 is then automatically longitudinally aligned along longitudinal axis 14 so as to be in piston driving pressure engagement with cartridge plunger 12. Assuming that the cartridge 10 is a new cartridge, that is an unused cartridge, the heat transfer plug 66 is then removed from its mounting 62–64 and the rotary cutter 68 thereof is preferably utilized to cut the desired size extrusion outlet or aperture 20 in tip 18. The annular heating coil 36 is then plugged into a conventional source of electric power and the rheostat 60 conventionally adjusted so as to cause the annular heating coil 36 to conventionally provide a desired temperature to the interior of the heat sleeve 24 to heat the thermoplastic-type medium contents of storage container portion 10a to the temperature required for the stored material to flow through extrusion outlet 20 and be workable when simultaneously therein pressure is applied along the longitudinal axis 14 by conventional ratchet-type movement of piston 56 and rod 54 under actuation of trigger 52. This ratchet-type movement of piston 56 and rod 54 longitudinally advances the container plunger 12 in the direction of arrow 16 along longitudinal axis 14 to cause the heated thermoplastic-type medium to flow out through extrusion outlet 20 with the aforementioned thermal heat being preferably applied by annular electric coil 36 and reflected to the interior of heat sleeve 24 by the heat reflective surfaces of sleeves 28 and 30 until the thermoplastic type medium stored within the container storage portion 10a flows through the extrusion outlet 20. For example, in the instance of conventional caulking, the caulking cartridge 10a is preferably heated to at least 50° for a new cartridge whereas an initial heat of up 70° to 80° F may be necessary for a previously used cartridge. As previously mentioned, annular heating element 36 may preferably be a 50 watt heating element having a calibrated rheostat control 60 with the primary requisite being that the heat be sufficient to enable flow through extrusion outlet 20 while keeping the thermoplastic-type medium which is longitudinally extruded through extrusion outlet 20 workable. The aforementioned reflective coating on the interior of heat reflective sleeves 28 and 30 is preferably a conventional nonconductive reflective coating which both traps and enhances the heat within the interior of the hollow heat sleeve 24. Furthermore, the aforementioned removable burst shield sleeve 32 may preferably be either disposable or reuseable after cleaning.

In utilizing the preferred heat transfer plug 66 of the present invention, after the rotary cutter portion 68 is used to cut the tip 18, and the desired amount of longitudinal extrusion of the thermoplastic-type medium from the storage container 10 has been accomplished, the tip 18 may be resealed to prevent leakage of the thermoplastic-type medium therefrom until such time as further use thereof is desired. The tapered portion 66b of the heat transfer plug 66 serves to provide this reseal for the tip 18. When it is desired to use the remaining thermoplastic-type medium stored in the storage container 10a, the annular electric coil 36 is preferably plugged in again and power supplied thereto to heat the contents of container 10a to the desired temperature which permits ease of flow and workability for the thermoplastic-type medium being utilized. The heat transfer portion 66a of heat transfer plug 66 is simultaneously heated during this time as the contents of the storage portion 10a of the container 10 are heated and accordingly it transfers heat out to the tip portion 18 at the extrusion outlet 20 which heat would not normally be transferred thereto since the extrusion outlet 20 extends outside the interior of the hollow heat sleeve 24. Furthermore, the heat transfer plug 66 thus prevents clogging of the extrusion outlet 20 during non-use of the gun 26 while both sealing the tip to facilitate temporary storage and facilitating initial flow of the thermoplastic-type medium through the extrusion outlet 20 when the gun 26 is again heated to be utilized.

Referring now to FIGS. 4 and 5, an alternative embodiment 26a of the present invention employing an alternative embodiment 24a of the preferred heat sleeve 24 is shown. The removable heat sleeve 24a shown in FIGS. 4 and 5 is preferably identical with that shown in FIGS. 2 and 3 and identified by reference numeral 24 with the exception that the burst shield 32 of heat sleeve 24 is replaced with a removable partial burst shield cap 32a. Heat sleeve 24 may thus be converted to heat sleeve 24a by merely removing burst shield 32 and replacing it with partial 6 burst shield cap 32a. The modified heat sleeve 24a of FIGS. 4 and 5 is preferably for use with conventional ratchet-type caulking guns having a semi-cylindrical housing portion 100 for resting the caulking cartridge 10 therein, such as manufactured by Vital Manufacturing Co., Cleveland, Ohio. The drive mechanism of caulking gun 26a is preferably identical with that previously described with reference to FIG. 2 in that a conventional ratchet-type mechanism comprising a piston 56, rod 54 and trigger actuation 52 for longitudinal advance of the piston along the longitudinal axis 14 of the cylinder 10 is shown, piston 56 engaging cartridge plunger 12 to longitudinally advance the plunger 12 along the longitudinal axis 14 of the container 10a and force the thermoplastic-type medium stored in storage portion 10a out through extrusion outlet 20. In the instance of such a caulking gun 26a having the semi-cylindrical housing portion 100, this housing portion 100 acts as a portion of the complete burst shield for the storage container 10a. Thus, the storage container 10 is conventionally inserted in housing portion 100 with the plunger 12 automatically being aligned with piston 56 in pressure driving engagement therewith, and the semi-cylidrical burst shield cap sleeve portion 32a is inserted over housing portion 100, as shown in FIG. 5, to complete the burst shield enclosure for the storage container 10, cap portion 32a and housing 100 thereby cooperating and functioning in the same manner as the aforementioned burst shield 32 to provide a complete burst shield enclosure for the storage container 10a and physically isolate the innermost heat reflective sleeve 30 from the storage container 10a. Once again, the housing portion 100 and the burst sleeve cap portion 32a are preferably heat transmissive so as to enable heating of the thermoplastic-type medium within the cartridge 10 to the desired temperature. The balance of the operation of the improved extrusion gun of FIGS. 4 and 5 is preferably identical with that previously described with reference to FIGS. 2 and 3 and will not be described in greater detail hereinafter, identical reference numerals with those used in FIGS. 2 and 3 being utilized for identical functioning components in FIGS. 4 and 5.

By utilizing the heated extrusion gun of the present invention, continuous heat can be applied to an extrudable thermoplastic-type medium while the pressurized extrusion thereof is occurring so as to make such pressure actuated extrusion independent of the outside ambient temperature of the storage container therefor, such as in the instance of caulking when such outside ambient temperature is below room temperature at which such caulking normally flows.

What is claimed is:

1. In a hand-holdable gun for longitudinally extruding a thermoplastic type medium from a removable self-contained storage container therefor in response to piston pressure along the longitudinal axis of said container wherein said gun contains a longitudinally movable piston means for applying said piston pressure along said container longitudinal axis and said cartridge container includes a plunger means movable along said longitudinal axis of said cartridge container in response to said piston pressure, and an outlet for enabling said piston pressure responsive extrusion therefrom, said thermoplastic medium longitudinal extrusion being dependent on the temperature of said thermoplastic medium during said piston pressure responsive extrusion; the improvement comprising a removable hollow heating sleeve having an internal diameter sufficient to surround said cartridge container for providing a controlled temperature to said heat sleeve surrounded thermoplastic type medium during said piston pressure responsive extrusion to enhance the flowability of said thermoplastic type medium from said cartridge container independently of the ambient temperature outside said heating sleeve, said heating sleeve comprising a first heat reflective sleeve surrounding said cartridge container for reflecting heat toward said hollow heating sleeve interior for providing said controlled temperature thereto, an electric heating coil surrounding said first heat reflective sleeve for heating said hollow heat sleeve interior to said controlled temperature in response to a voltage applied thereto, and a first heat transmissive removable burst shield sleeve within the interior of said first heat reflective sleeve and at least partially surrounding said heat sleeve surrounded cartridge container to provide at least a portion of a complete burst shield protective enclosure therefor for physically isolating said heat sleeve first reflective sleeve and heating coil from said cartridge container to prevent fouling thereof in the event of a burst of said cartridge container while enabling heating of said thermoplastic type medium within said cartridge container to said controlled temperature, said heating sleeve further comprising an end cap at one end thereof having an opening therein for receiving said extrusion outlet of said surrounded container therein, whereby said thermoplastic type piston pressure actuated extrusion may be readily accomplished independent of the outside ambient temperature of said storage container therefor.

2. An improved thermoplastic type medium longitudinal extrusion gun in accordance with claim 1 wherein said heating sleeve further comprises a second heat reflective sleeve surrounding said heating coil for reflecting heat toward said hollow heating sleeve interior, said first and second heat reflective sleeves sandwiching said heating coil therebetween.

3. An improved thermoplastic type medium longitudinal extrusion gun in accordance with claim 2 wherein said heating coil comprises rheostat means for controllably varying said controlled temperature provided thereby.

4. An improved thermoplastic type medium longitudinal extrusion gun in accordance with claim 3 wherein said longitudinally movable piston means comprises trigger activated ratchet means.

5. An improved thermoplastic type medium longitudinal extrusion gun in accordance with claim 4 further comprising heat transfer plug means removably insertable in said outlet to prevent extrusion therefrom while initially transferring heat to said thermoplastic type medium within said extrusion outlet when said controlled temperature is initially provided by said heating sleeve to said cartridge container interior to facilitate flow from said extrusion outlet and prevent clogging thereof in the absence of said extrusion therefrom, said plug means being removable to enable said extrusion from said extrusion outlet.

6. An improved thermoplastic type medium longitudinal extrusion gun in accordance with claim 5 wherein said heat transfer plug is tapered to accommodate different diameter extrusion outlets.

7. An improved thermoplastic type medium longitudinal extrusion gun in accordance with claim 6 wherein said heating sleeve further comprises means for removably mounting said heat transfer plug during the non-use thereof during extrusion from said extrusion outlet.

8. An improved thermoplastic type medium longitudinal extrusion gun in accordance with claim 7 wherein said heat transfer plug means further comprises cutting means for cutting said extrusion outlet in said container.

9. An improved thermoplastic type medium longitudinal extrusion gun in accordance with claim 8 wherein said first removable burst shield sleeve completely surrounds said heat sleeve surrounded cartridge container to form said complete burst protective enclosure therefor.

10. An improved thermoplastic type medium longitudinal extrusion gun in accordance with claim 8 wherein said gun comprises a heat transmissive housing portion insertable in said heat sleeve interior within said first heat reflective sleeve for partially surrounding said container, said first removable burst shield sleeve being cooperable therewith to completely surround said heat sleeve surrounded cartridge container to form said complete burst protective enclosure therefor.

11. An improved thermoplastic type medium longitudinal extrusion gun in accordance with claim 1 further comprising heat transfer plug means removably insertable in said outlet to prevent extrusion therefrom while initially transfering heat to said thermoplastic type medium within said extrusion outlet when said controlled temperature is initially provided by said heating sleeve to said cartridge container interior to facilitate flow from said extrusion outlet and prevent clogging thereof in the absence of said extrusion therefrom, said plug means being removable to enable said extrusion from said extrusion outlet.

12. An improved thermoplastic type medium longitudinal extrusion gun in accordance with claim 11 wherein said heat transfer plug is tapered to accommodate different diameter extrusion outlets.

13. An improved thermoplastic type medium longitudinal extrusion gun in accordance with claim 12 wherein said heating sleeve further comprises means for removably mounting said heat transfer plug during the non-use thereof during extrusion from said extrusion outlet.

14. An improved thermoplastic type medium longitudinal extrusion gun in accordance with claim 11 wherein said heat transfer plug means further comprises cutting means for cutting said extrusion outlet in said container.

15. An improved thermoplastic type medium longitudinal extrusion gun in accordance with claim 12 wherein said first removable burst shield sleeve completely surrounds said heat sleeve surrounded cartridge container to form said complete burst protective enclosure thereof.

16. An improved thermoplastic type medium longitudinal extrusion gun in accordance with claim 1 wherein said gun comprises a heat transmissive housing portion insertable in said heat sleeve interior within said first heat reflective sleeve for partially surrounding said container, said first removable burst shield sleeve being cooperable therewith to completely surround said heat sleeve surrounded cartridge container to form said complete burst protective enclosure therefor.

17. An improved thermoplastic type medium longitudinal extrusion gun in accordance with claim 1 wherein said thermoplastic type medium is selected from the group consisting of caulking mediums, adhesive mediums and sealant mediums.

18. A removable hollow heating sleeve for use in a hand-holdable gun for longitudinally extruding a thermoplastic typemedium from a removable self-contained storage cartridge container therefor in response to piston pressure along the longitudinal axis of said container wherein said gun contains a longitudinally movable piston means for applying said piston pressure along said container longitudinal axis and said cartridge container includes a plunger means movable along said longitudinal axis of said cartridge container in response to said piston pressure, and an outlet for enabling said piston pressure responsive extrusion therefrom, said thermoplastic medium longitudinal extrusion being dependent on the temperature of said thermoplastic medium during said piston pressure responsive extrusion; said removable hollow heating sleeve having an internal diameter sufficient to surround said cartridge container for providing a controlled temperature to said heat sleeve surrounded thermoplastic type medium during said piston pressure responsive extrusion to enhance the flowability of said thermoplastic type medium from said cartridge container independently of the ambient temperature outside said heating sleeve, said heating sleeve comprising a first heat reflective sleeve surrounding said cartridge container for reflecting heat toward said hollow sleeve interior for providing said controlled temperature thereto, an electric heating coil surrounding said first heat reflective sleeve for heating said hollow heat sleeve interior to said controlled temperature in response to a voltage applied thereto, and a first heat transmissive removable burst shield sleeve within the interior of said first heat reflective sleeve and at least partially surrounding said heat sleeve surrounded cartridge container to provide at least a portion of a complete burst shield protective enclosure therefor physically isolating said heat sleeve first reflective sleeve and heating coil from said cartridge container to prevent fouling thereof in the event of a burst of said cartridge container while enabling heating of said thermoplastic type medium within said cartridge container to said controlled temperature, said heating sleeve comprising a second heat reflective sleeve surrounding said heating coil for reflecting heat toward said hollow heating sleeve interior, said first and second heat reflective sleeves sandwiching said heating coil therebetween, and an end cap at one end of said heating sleeve having an opening therein for receiving said extrusion outlet of said surrounded container therein, whereby said thermoplastic type piston pressure actuated extrusion may be readily accomplished independent of the outside ambient temperature of said storage container therefor.

19. A removable hollow heating sleeve in accordance with claim 18 wherein said heating coil comprises rheostat means for controllably varying said controlled temperature provided thereby.

20. A removable hollow heating sleeve in accordance with claim 18 further comprising heat transfer plug means removably insertable in said outlet to prevent extrusion therefrom while initially transferring heat to said thermoplastic type medium within said extrusion outlet when said controlled temperature is initially provided by said heating sleeve to said cartridge container interior to facilitate flow from said extrusion outlet and prevent clogging thereof in the absence of said extrusion therefrom, said plug means being removable to enable said extrusion from said extrusion outlet.

21. A removable hollow heating sleeve in accordance with claim 20 wherein said heat transfer plug is tapered to accommodate different diameter extrusion outlets.

22. A removable hollow heating sleeve in accordance with claim 21 wherein said heating sleeve further comprises means for removably mounting said heat transfer plug during the non-use thereof during extrusion from said extrusion outlet.

23. A removable hollow heating sleeve in accordance with claim 20 wherein said heat transfer plug means further comprises cutting means for cutting said extrusion outlet in said container.

24. A removable hollow heating sleeve in accordance with claim 18 wherein said first removable burst shield sleeve completely surrounds said heat sleeve surrounded cartridge container to form said complete burst protective enclosure therefor.

25. A removable hollow heating sleeve in accordance with claim 18 wherein said gun comprises a heat transmissive housing portion insertable in said heat sleeve interior within said first heat reflective sleeve for partially surrounding said container, said first removable burst shield sleeve being cooperable therewith to completely surround said heat sleeve surrounded cartridge container to form said complete burst protective enclosure therefor.

26. A removable hollow heating sleeve in accordance with claim 18 wherein said thermoplastic type medium is selected from the group consisting of caulking mediums, adhesive mediums and sealant mediums.

* * * * *